United States Patent
Walsh et al.

[15] 3,703,244
[45] Nov. 21, 1972

[54] TRAILER CHASSIS

[72] Inventors: David P. Walsh; Joanne M. Walsh, both of 1400 Ramsey Drive, Edgewater, Md. 21037

[22] Filed: Oct. 31, 1969

[21] Appl. No.: 873,001

[52] U.S. Cl. ................... 214/517, 296/10, 296/35 A
[51] Int. Cl. ............................................... B60p 1/64
[58] Field of Search....... 214/517, 515; 296/35, 35 A, 296/28 M, 1 R, 10; 220/1.5; 105/366 B, 366 C

[56] References Cited

UNITED STATES PATENTS

| | | | |
|---|---|---|---|
| 1,521,156 | 12/1924 | Jenkins | 296/35 A UX |
| 3,119,503 | 1/1964 | Herpich | 296/35 A X |
| 2,846,264 | 8/1958 | Loomis | 296/35 A |
| 495,658 | 4/1893 | Bernstein | 296/57 UX |
| 3,266,836 | 8/1966 | Taylor et al. | 296/10 |
| 3,332,601 | 7/1967 | Hand | 214/515 X |

*Primary Examiner*—Benjamin Hersh
*Assistant Examiner*—John A. Pekar
*Attorney*—E. Barron Batchelder

[57] ABSTRACT

A multiple functional land trailer is provided which is adapted to receive, center and immovably hold material-receiving containers such as, shipping containers for bulk material, transporting means for animals, coach-type living or camping structures, or a plurality of material-receiving modular units and the like.

11 Claims, 24 Drawing Figures

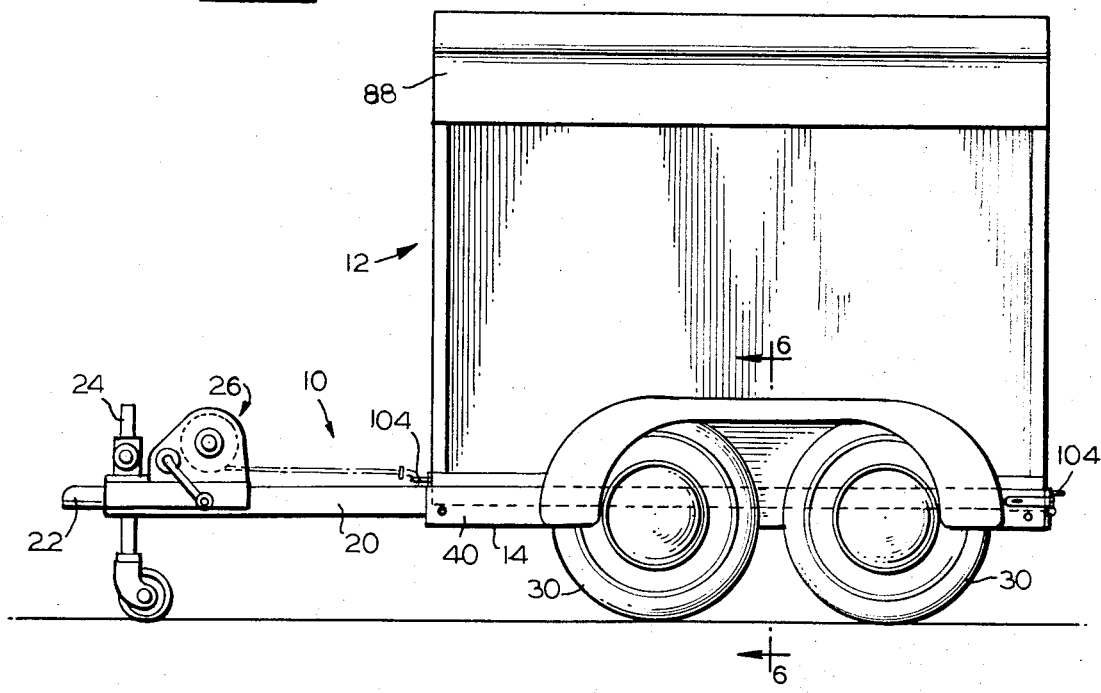
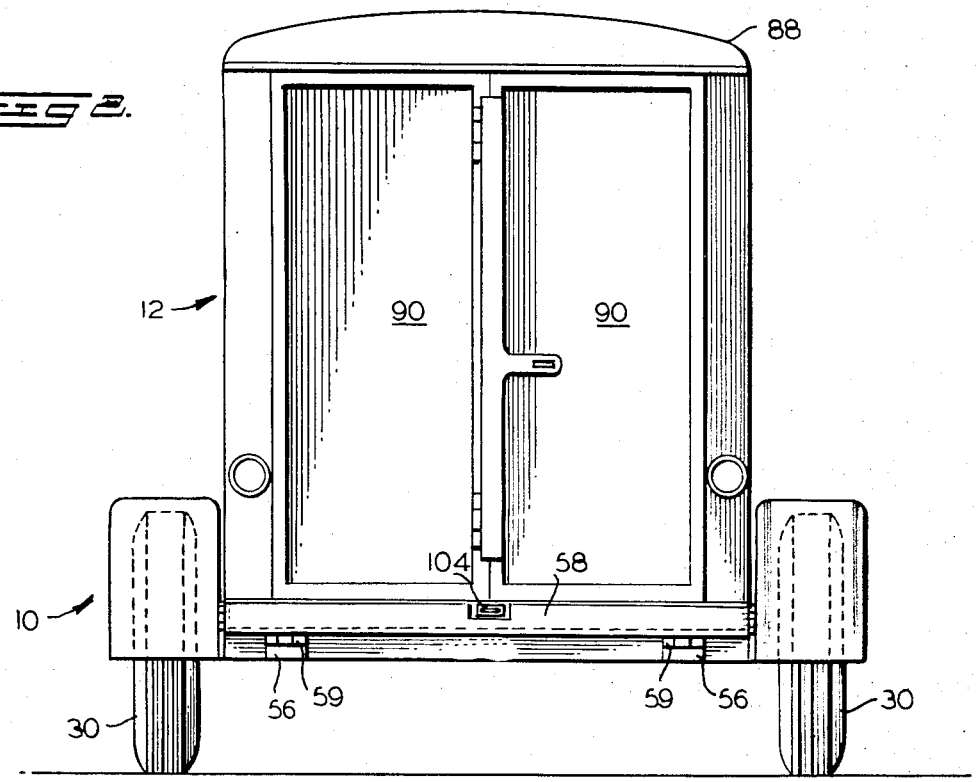

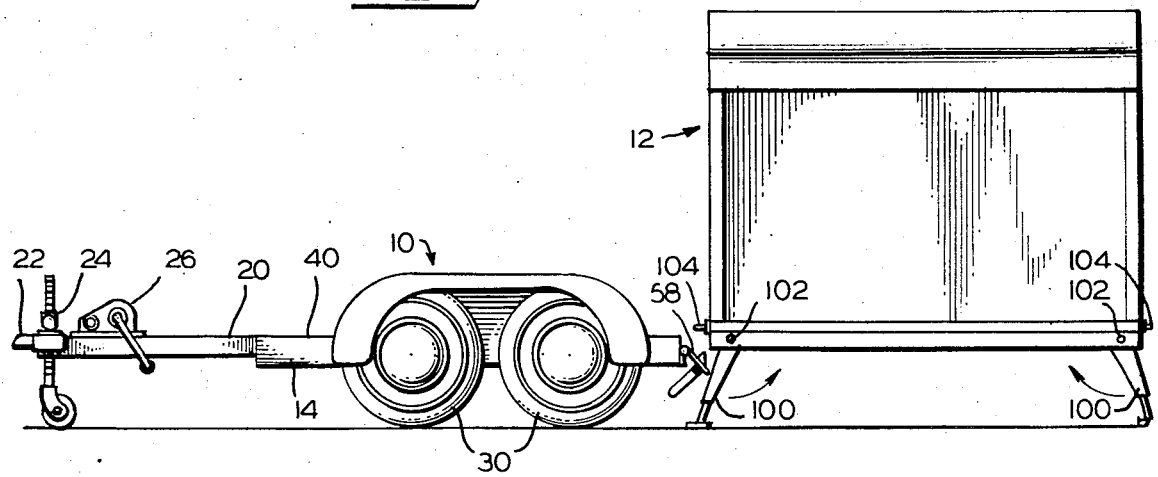
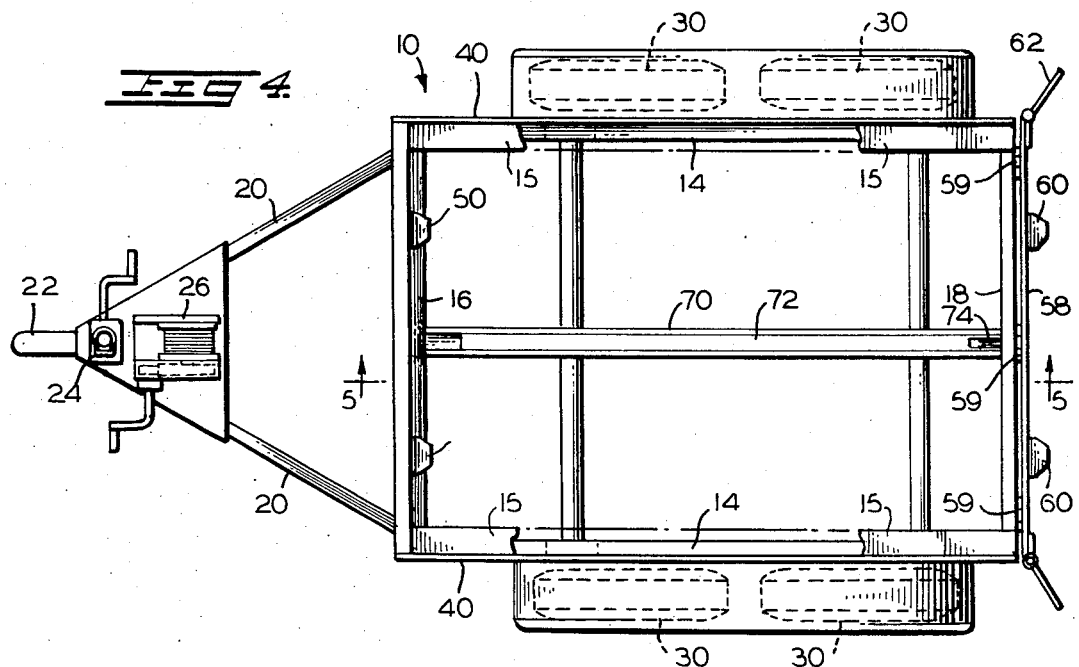
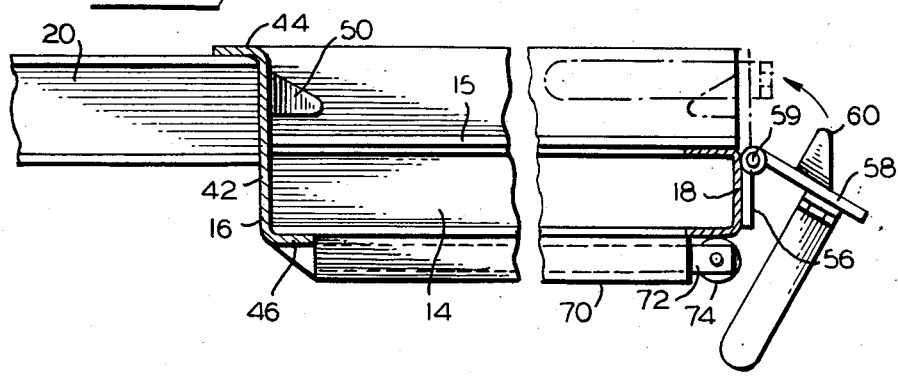

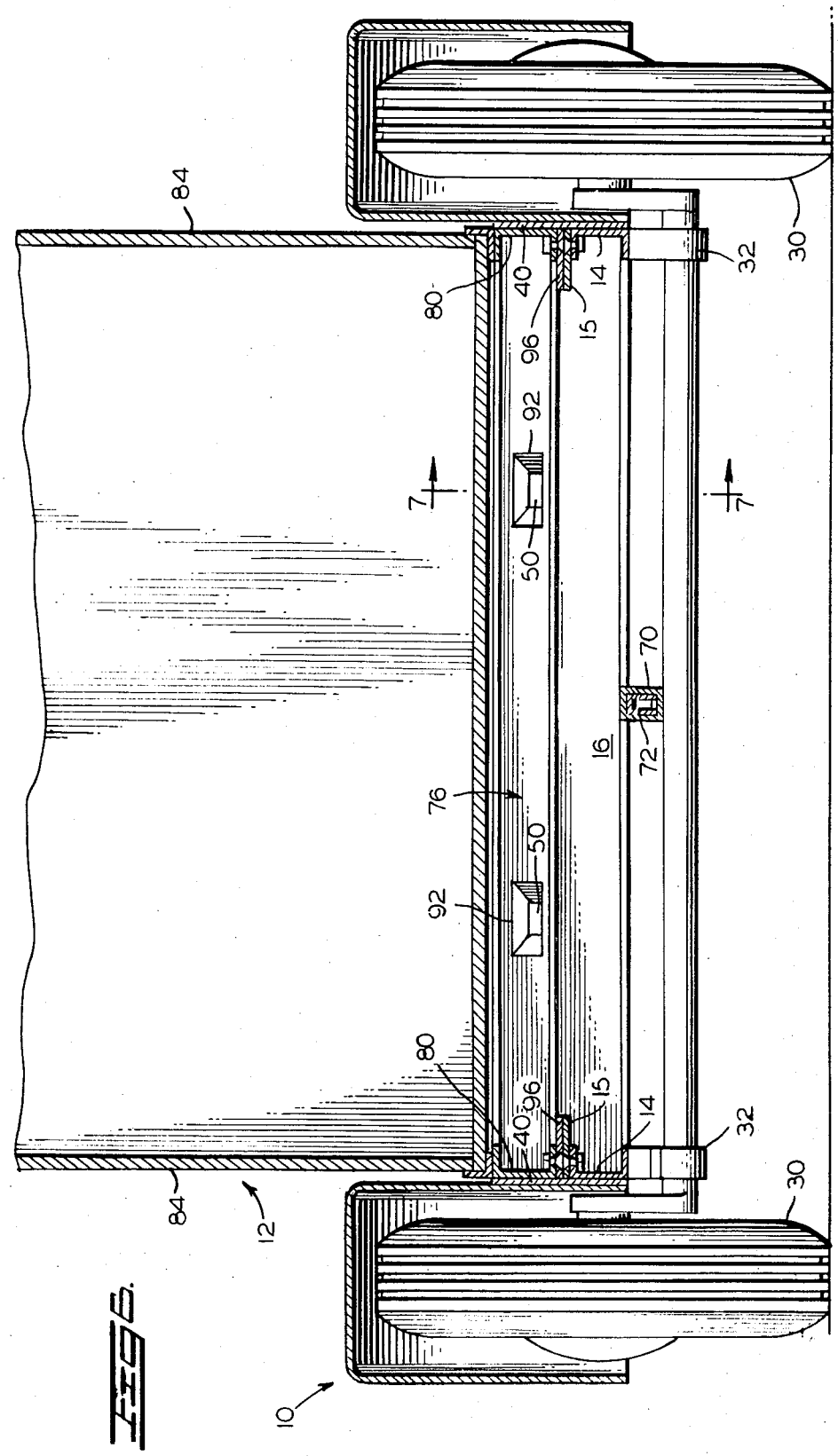

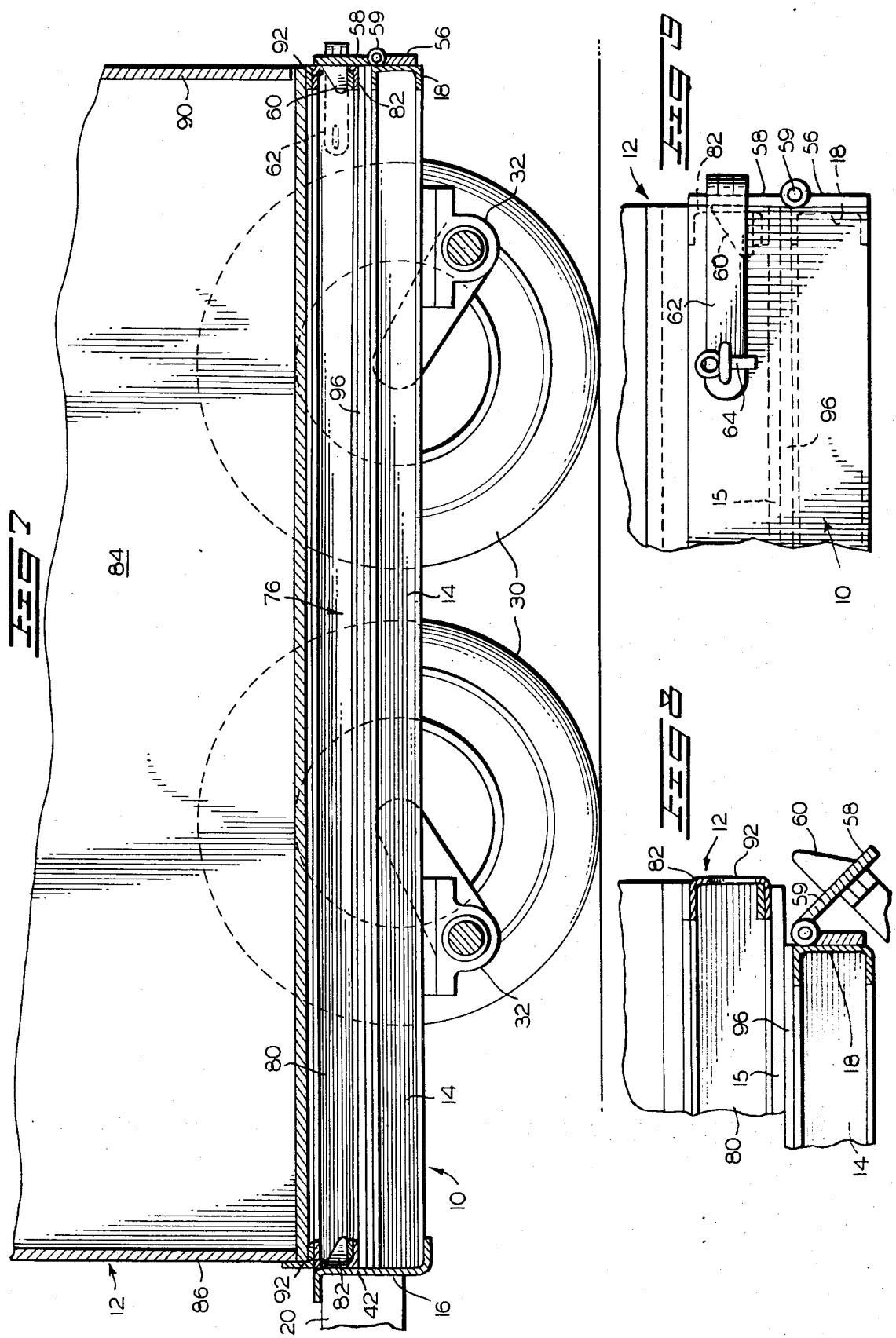

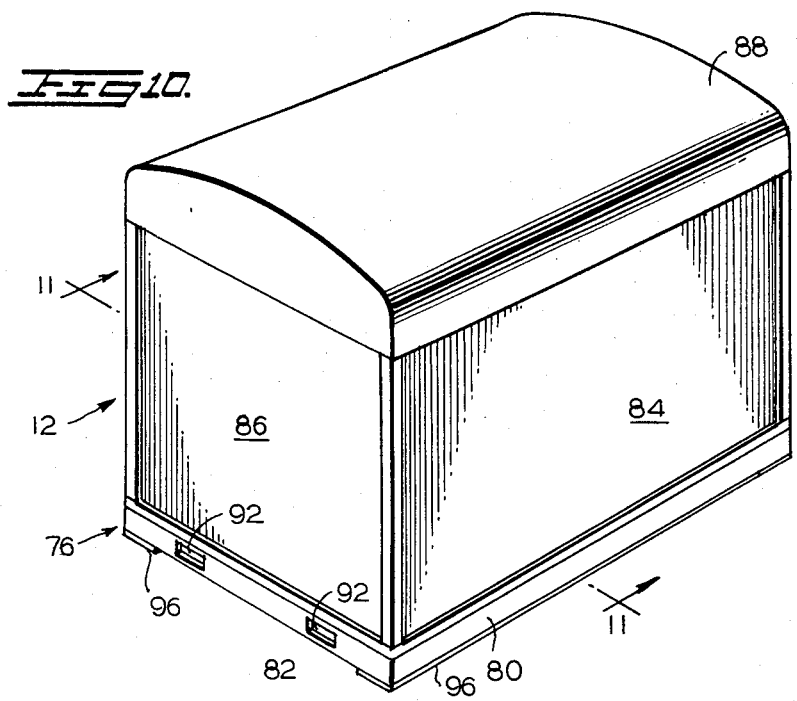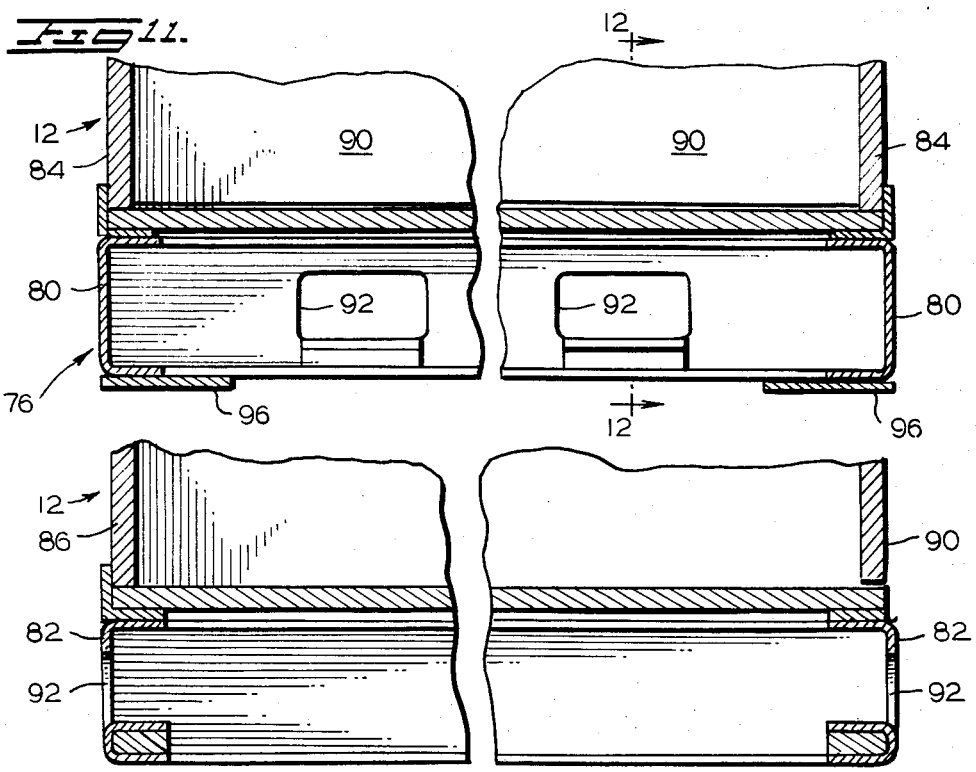

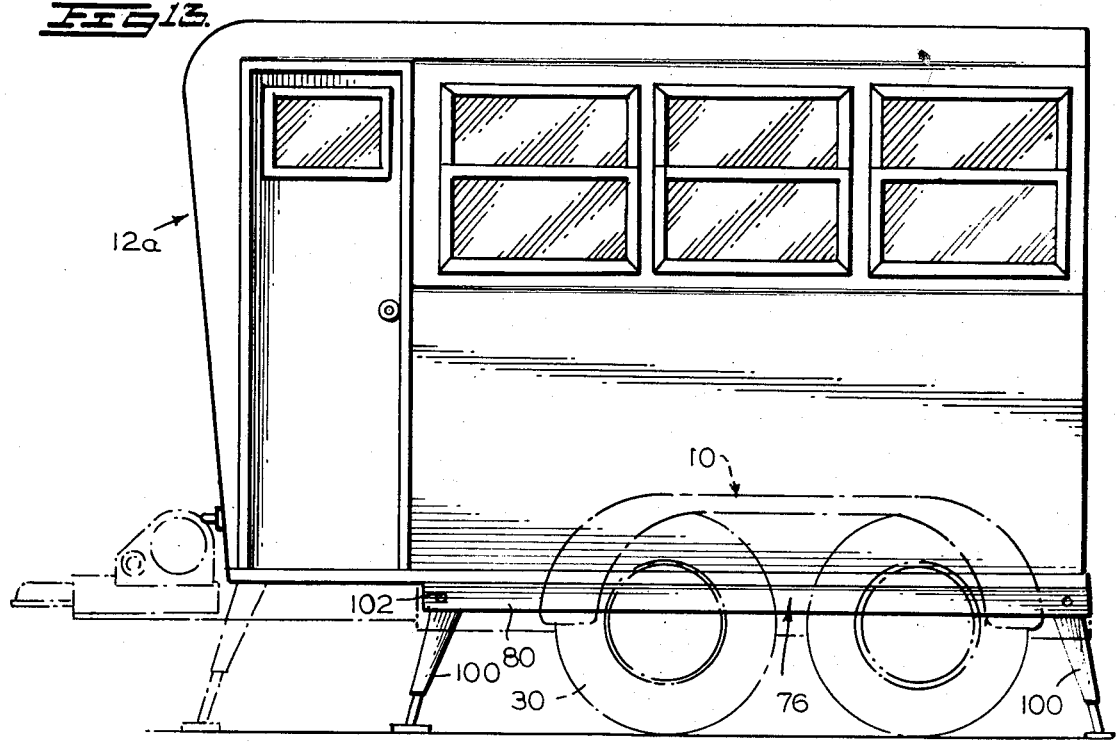
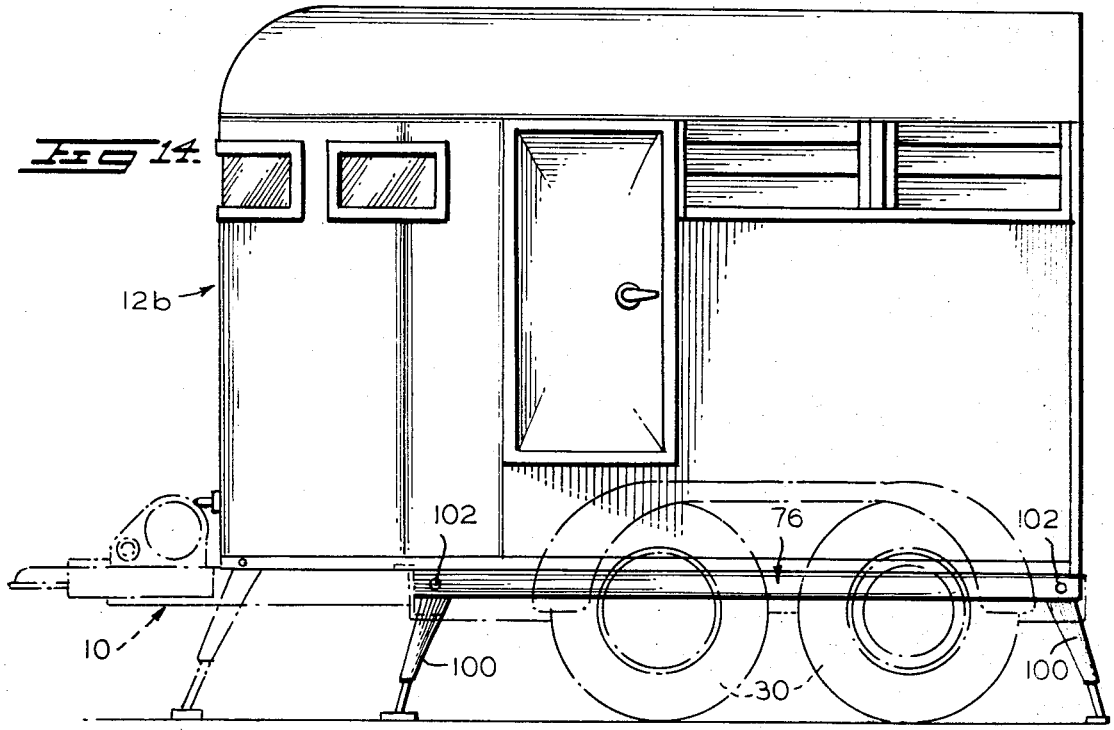

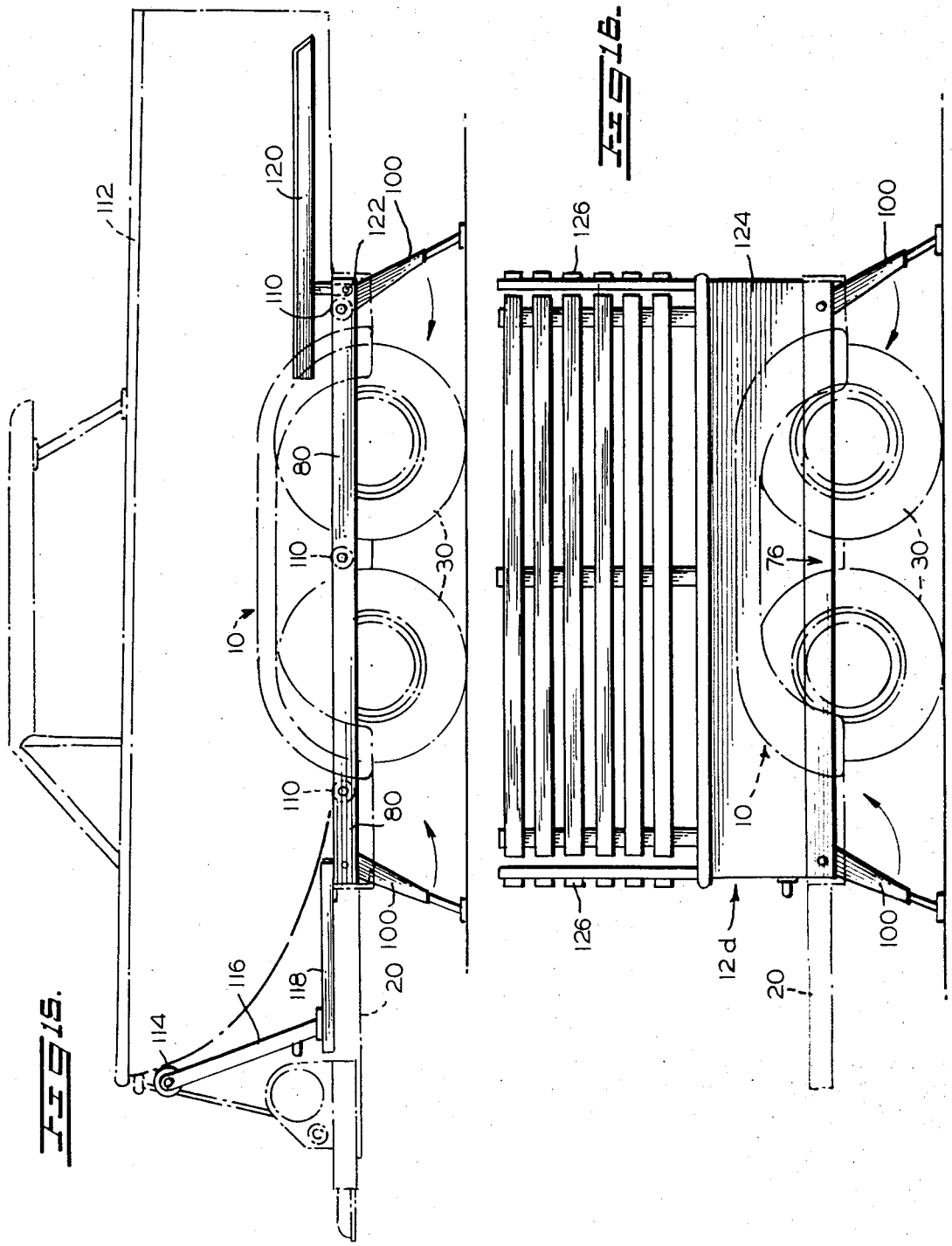

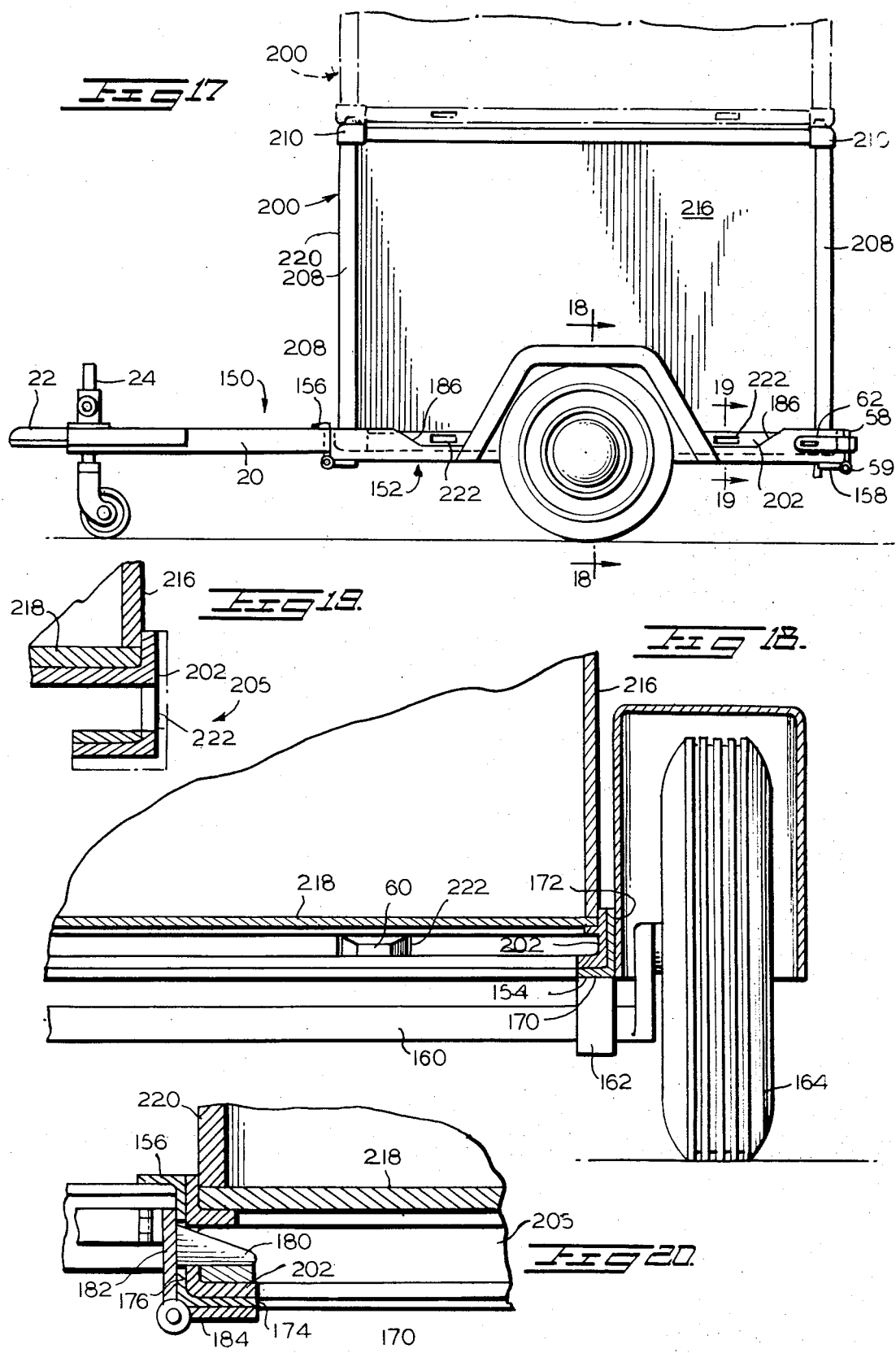

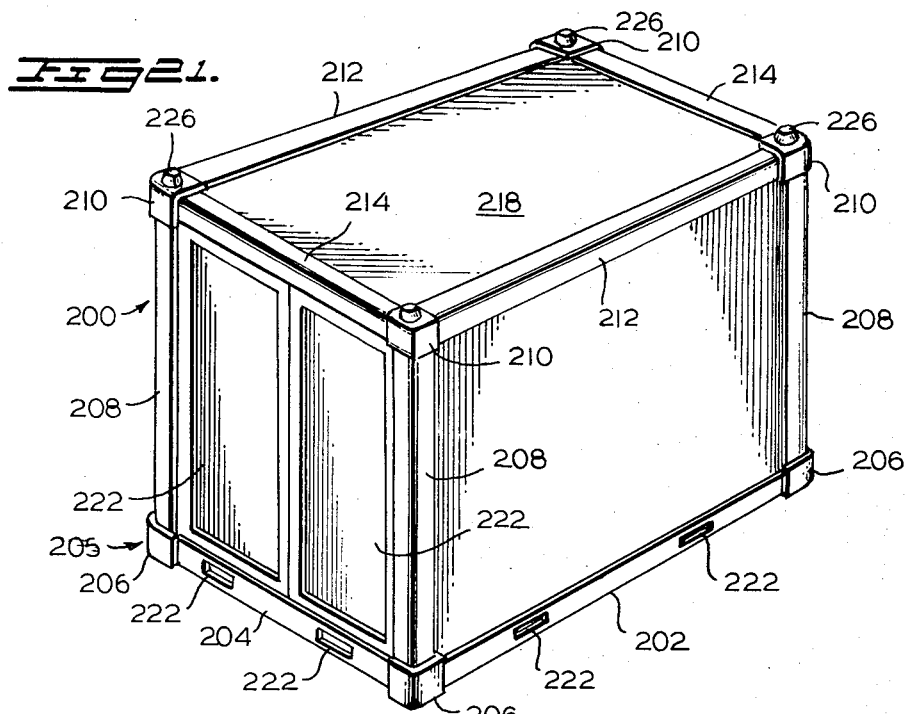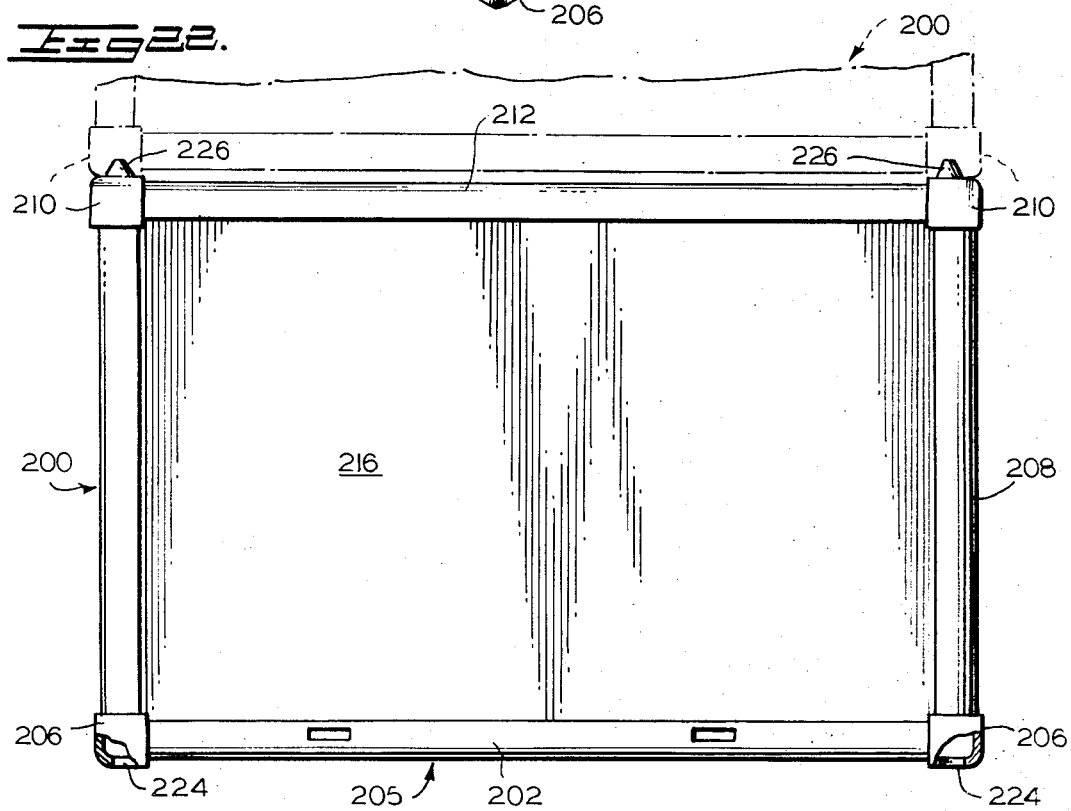

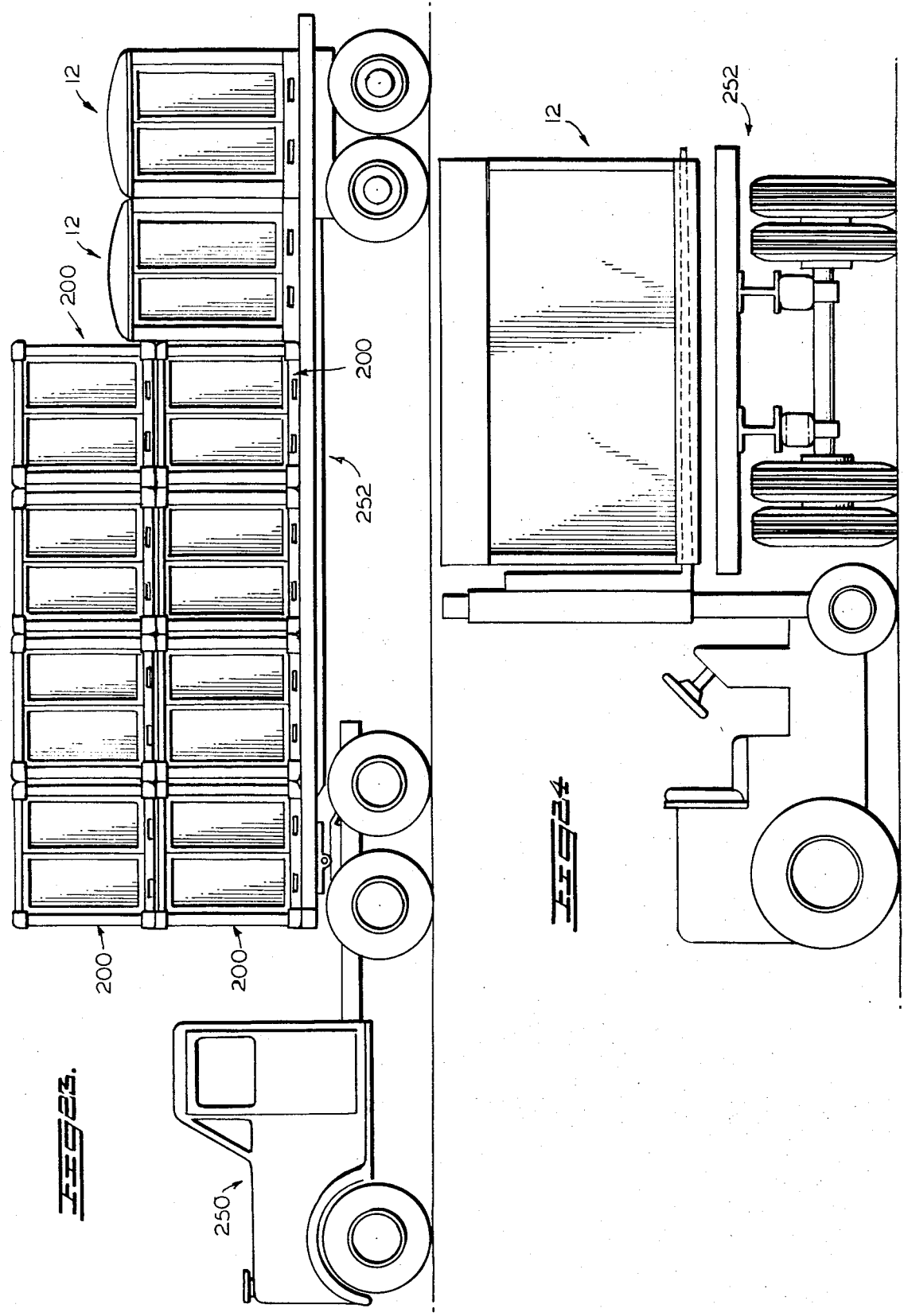

3,703,244

TRAILER CHASSIS

The present invention relates to a trailer chassis unit comprising conventional means for attachment to an automotive vehicle, and more particularly to the interchangeable units adapted to be secured to the trailer chassis. These modular units may take the form of a van type unit so constructed to permit the safe and protected transportation of storageable materials from one place to another. Another type of modular unit may be of the camper type or self-contained type unit for recreational or housing facilities. Still another type of modular unit may be in the form of a unit for conveying horses or livestock. Still further units could be of the type for the land conveyance of a boat or open type of bed similar to the open bed of a truck. A commercial type of shipping container may also be employed wherein articles may be placed within a container for shipping purposes and then sealed by the shipper and conveyed to a terminal point where the sealed container is removed from the chassis and placed on the flat bed of a large tractor trailer adapted to receive a plurality of containers and safely transported to its destination with minimal handling procedures and economical shipping costs. An alternative is offered if the user of such a container so desires, he may transport it by use of a chassis adapted to receive and secure the container.

The problem existant in the conventional types of trailers presently on the market, is that the chassis for each type forms an integral part of the trailer and as a consequence, imposes impracticalities on the owner, due to the simple fact that he must license and maintain the vehicle, (i.e., the chassis), regardless of the need for the particular body that is fixidly secured thereto. Referring now to the drawings:

FIG. 1 is a side elevational view of the chassis having a van type of unit secured thereto.

FIG. 2 is a rear elevational view of FIG. 1.

FIG. 3 is similar to FIG. 1 showing the detachable unit removed from the chassis.

FIG. 4 is a top plan view of the chassis.

FIG. 5 is an enlarged detailed fragmentary sectional view taken along the line 5—5 of FIG. 4 and showing structural details of the chassis unit and the modular unit retainer means.

FIG. 6 is an enlarged detailed transverse fragmentary sectional view taken along the line 6—6 of FIG. 1 showing the cooperative engagement between the chassis and modular unit.

FIG. 7 is a longitudinal detailed fragmentary sectional view taken along the line 7—7 of FIG. 6 illustrating the cooperative engagement between the chassis and modular unit along with means for retaining secured engagement of the two components.

FIG. 8 is a detailed fragmentary sectional view of the right hand end of FIG. 7 showing the modular unit frame portion in a partially retracted position from the chassis with the retainer means swung to the out-of-the-way position.

FIG. 9 is a side elevational view of the components of FIG. 8 showing the modular unit as being properly positioned with the chassis retainer means in place in dotted line and the locking means secured.

FIG. 10 is a perspective view of the van type of modular unit.

FIG. 11 is an enlarged fragmentary transverse sectional view taken along the line 11—11 of FIG. 10 showing the detailed structure of the lower portion of the unit.

FIG. 12 is a detailed fragmentary longitudinal sectional view taken along the line 12—12 of FIG. 11 and shows the apertured portion of the lower structural detail of a modular unit adapted to receive the securing means of the chassis.

FIG. 13 is a side elevational view showing a camper type modular unit along with its disengageable self-supporting means while not forming part of the chassis and further illustrates the position of the chassis in phantom line when in engagement position with the modular unit.

FIG. 14 is a side elevational view similar to FIG. 13 and shows a varied type of modular unit for the conveyance of livestock, such as horses.

FIG. 15 is a side elevational view showing a modular unit adapted for the land conveyance of a boat.

FIG. 16 is a side elevational view showing a still further modified type of modular unit adapted for the use of open bed truck type hauling.

FIG. 17 is a side elevational view of a modified form of chassis and container adapted for commercial use.

FIG. 18 is an enlarged detailed fragmentary sectional view taken along the line 18—18 of FIG. 17 which shows modified structural detail.

FIG. 19 is a still further enlarged sectional view taken along the line 19—19 of FIG. 17.

FIG. 20 is an enlarged fragmentary sectional view of the lower left hand portion of the modified chassis and container shown in FIG. 17 and illustrates a removable retainer for the easy removal of the commercial type of container.

FIG. 21 is a perspective view of the container unit shown in FIG. 17 as being removed from the chassis.

FIG. 22 is a side elevational view of the container unit shown in FIG. 21 and illustrates the manner in which a plurality of containers can be stacked in superimposed relationship as shown in phantom line.

FIG. 23 is a side elevational view of a plurality of stacked containers as resting on the flat bed of a large interstate type of tractor trailer truck for transporting the containers to varying destinations.

FIG. 24 is a rear elevational view of the truck shown in FIG. 23 and a method for easy removal for placement of the container units shown in FIG. 10.

In the drawings, reference numeral 10 generally indicates a trailer chassis adapted to receive varying types of modular body units generally referred to by reference numerals 12, 12a, 12b, 12c, and 12d. As may be seen in FIGS. 1, 2 and 3 the modular units 12, are readily detachable from the chassis 10 and are adapted to be supported by means of retractable legs which retain the unit in an upright spaced condition from the ground which permits the use of the modular unit once it has been put in place and relieves the movable chassis for employment with any of the other types of modular units which are each interchangeable with the other whether it be a camper type unit as indicated at 12a or any of the other units previously described.

Referring now more particularly to the chassis 10 as seen in FIGS. 1, 2, 3, 4, 6, and 7, the vehicle comprises a generally rectangular frame structure having longitudinal side rails 14 and transverse forward and rearward end frame members 16 and 18. A conventional type of trailer tongue is provided by the forwardly and medially extending channel iron members 20 which terminate and are fixedly secured to a conventional socket-type of trailer hitch as indicated by the reference numeral 22. The trailer tongue is provided with a conventional type of retractable support wheel 24 approximate and adjacent to the ball hitch 22, the purpose of which is to form a support means for the forward portion of the chassis when in a detached condition. A winch 26 is provided rearwardly and adjacent the support wheel 24, the function of which will be hereinafter described. The trailer bed comprising the side rails 14 and transverse end members 16 and 18 which form the load-bearing surfaces, is supported by tandem-type type wheels 30, the axles of which are suitably journaled in bearings 32 fixedly secured by means of welding or bolts to the undersides of the side rails 14. The trailer bed side rails 14 are provided on their outer faces with side plates 40 fixedly secured thereto. These side plates 40 are of a greater height than the frame members 14 and the upper extending inner faces of these side plates 40 provide a keeper or retaining means for the lower frame structure 76 of the modular units 12. The transverse forward end frame member 16 comprises a vertical web section 42, the height of which is equal to the height of the side plate portions 40, and is welded to the longitudinal side rail frame members 14 and side plates 40. The forward end frame member 16 comprising the web portion 42 has oppositely extending flanges 44 and 46 to add structural rigidity to the chassis bed. The transverse connecting rear end frame member 18 is of the same height as the longitudinal side rail frame members 14 and is welded at its ends to each of these members.

From the foregoing, it will be seen that the chassis bed section, while of rectangular configuration, has by means of the vertically extended side plates 40 and coextensive web 42 of the forward transverse end frame member 16 formed a u-shaped receptacle with the longitudinal side rail frame members 14 being provided with skid plates 15 on their upper surfaces, as supporting means for the sliding insertion of a modular unit, the structure of which will be hereinafter described. The co-extensive web surface 42 forms an abuttment face for the forward portion of the modular unit while the side plates 40 prevent lateral movement. The extended web portion 42 of the forward transverse end frame member 16 is provided with modular retainer lugs 50 the function of which will be hereinafter described. The retainer lugs 50, have a lower horizontal surface while its upper and end surfaces are of angular configuration so as to provide camming surfaces for proper orientation and insertion into the frame structure of the modular units 12. The rear transverse end frame member 18 of the chassis frame has welded thereto a pair of hinge portions 56, to its outer face and pivotally fixed to a plate 58 as at 59 and the plate 58 is co-planer with the side plates 40 when in the raised position. The hinged plate 58 in its raised position forms an end closure means for the previously described u-shaped receptacle. A pair of retainer lugs 60, similar to those previously described by the reference numeral 50 are welded to the inner face of the hinged plate 58 and serve the same purpose for the opposite end of the modular unit. A pair of hinged elements 62 are welded to the ends of the plate 58 and form locking means to retain the plate 58 in a vertical position, the function of which is more clearly defined in FIGS. 4, 5, 8 and 9. The hinged elements 62 are secured in a suitable manner such as a keeper pin 64 (FIG. 9).

As viewed in FIGS. 4 and 5, a telescopic boom having a fixed portion 70 secured to the transverse chassis end frame members 16 and 18 and positioned beneath the trailer chassis and having an extensible boom 72 in sliding engagement with the inner faces of the fixed tubular member 70, has at one end thereof, a rotatable pulley 74 secured thereto and is positioned medially of the chassis bed, the purpose of which will be hereinafter described.

Referring now more particularly to FIGS. 10, 11 and 12, the modular van type of unit, generally indicated by the reference numeral 12, comprises a rectangular base frame structure, generally indicated by the reference numeral 76, having longitudinal side members 80 and transverse end members 82. The longitudinal side frame members 80 are welded or appropriately secured to the end frame members 82, which form a rectangular frame structure 76 adapted to support appropriate box-like van type units having side panels 84, an end panel 86, a roof closure 88 and access doors 90 at the opposite end of the panel 86. The transverse end frame portions 82 are apertured at 92 for a purpose to be described. A pair of skid plates 96 are appropriately secured to the bottom portions of the longitudinal frame members 80.

From the foregoing, it will be understood that the rectangular base frame structure 76 of the modular unit 12 is adapted to be received in nested relationship with the u-shaped opening of the chassis frame and is secured thereto by means of engagement of the apertured openings 92 in the forward transverse frame member 82 with the retainer lugs 50, which form a fixed part of the chassis frame. Once in place and properly positioned by means of the previously described nesting qualities of the chassis and modular unit, the previously described pivotal end plate 58 is rotated into the position seen in FIG. 7 with the retainer lugs 60 entering the apertured openings 92 of the rear transverse frame member 82 thereby closing the u-shaped opening of the chassis by means of the plate 58 and locking the modular unit 12 in place against vertical or rearward movement by retainer lugs 60 and plate 58.

Collapsible supporting legs 100, pivotally mounted as at 102, to the longitudinal base frame members 80 of the modular unit 12, form a support means for the unit and are rotated to an out-of-the-way position when the unit 12 is in nested relationship with the chassis 10. A u-shaped eye 104 is fixedly secured to each transverse frame member 82 of the modular unit 12 and is adapted to receive the hook on the cable end of the winch 26. The chassis 10 is positioned to receive the modular unit 12, more particularly seen in FIG. 3, and the cable of the winch 26 is withdrawn so as to permit the hook thereon to secure the eye 104 on the forward end of the modular unit and as the winch cable is retracted, the modular unit 12 is brought into nested relationship with the chassis and locked thereto as described above.

To remove the unit from the chassis, the previously described extensible boom 72 is extended and the winch cable is passed beneath the chassis and trained around the pulley 74 of the extensible boom and the hook at the cable end secured to the eye 104 on the rear of the modular unit and, once again, as the cable is withdrawn, the modular unit and chassis are separated and the pivotal supporting legs 100 rotate into position to again form support means for the unit.

FIG. 13 shows a modified modular unit generally designated by the reference numeral 12a, which constitutes a camper or trailer home type facility, comprising sleeping, cooking, storage and toilet facilities, conventionally employed in the mobile home type of trailer. The unit 12a rests upon the identical rectangular frame structure 76 employed in FIGS. 11 and 12 and is adapted to be received by the chassis 10 shown in phantom line, in a similar manner. The forward portion of the unit overhangs and is supported by the chassis tongue structure previously described.

FIG. 14 illustrates another modular unit and is designated generally by the reference numeral 12b, comprising the conventional facility for the conveyance of livestock, such as horses. This unit is fixedly secured to an identical subframe structure 76 as the previous units described and adapted to be received, contained and removed in a similar manner.

FIG. 15 illustrates a further modified modular unit adapted to support a boat for land conveyance. The same type of modular subframe construction 76 is employed comprising the longitudinal side frame members 80 and transverse end frame members 82 with pivotal supporting legs 100. The longitudinal side frame members 80 are provided with transverse rotatably supporting rollers 110, the function of which is to support the hull of a boat indicated in phantom line by the reference numeral 112 and is supported at its bow by means of a snub roller 114 rotatably journaled in a standard 116, which is in turn welded or otherwise secured to an outrigger frame 118 forming a part of the modular base frame structure 76 and is supported by the members 20 of the tongue structure of the chassis which is indicated in phantom line by the reference numeral 10. The stern of the boat is supported by means of outrigger skid pads 120 which are pivotally mounted as at 122, to the longitudinal side frame members 80 of the modular base frame structure 76.

FIG. 16 illustrates still another modified modular unit generally indicated by the reference numeral 12d and comprises an open bed type of unit 124 for general hauling purposes and has removable side and end extenstion units 126. The open bed unit is fixedly secured to the previously described modular subframe structure 76 and is adapted to be received, contained and removed in a similar manner in cooperation with the chassis unit shown in phantom line and indicated by the reference numeral 10.

A modified form of chassis and modular container is shown in FIGS. 17 through 22 and illustrates structures which could be employed for commercial use, the function and purpose of which is hereinafter described. The modified chassis is generally indicated by the reference numeral 150 comprising a main frame construction indicated by the reference numeral 152 comprising longitudinal rails 154 and forward transverse end frame members 156 and rearward transverse end frame members 158. The forward transverse end frame member 156 as viewed in FIGS. 17 through 20, has secured to its outer face similar tongue elements as described in the previous FIGS. In this form of chassis, a single axle conveying means is shown indicated by the reference numeral 160, appropriately journaled in bearings 162 suitably mounted on the underside of the longitudinal rail frame members 154. The axles 160 have wheels 164 rotatably journaled and are provided with suitable spring support. The longitudinal rail frame members 154 are of L-shaped configuration and its inner surfaces are polished so as to receive, support and contain a removable unit. The lower horizontal inturned flanges 170 of the L-shaped longitudinal rail frame members 154, form the support means for the removable container, while the upstanding flanges 172 of the L-shaped longitudinal rail frame members 154 form a retaining means for the container unit. The forward transverse end frame member 156, more clearly seen in FIG. 20 has an inwardly turned flange support member 174 which is co-planer with the support flanges 170 of the longitudinal rail frame members 154. A vertical web portion 176 of the forward transverse end frame member 156 forms an abuttment face and retainer means for the modular container unit to be inserted and hereinafter described. The vertical web portion 176 is apertured as at 178 to permit passage of a removable retainer lug 180 which is welded or otherwise secured to a transverse hinge plate 182. The fixed hinge plate 184 is welded to the underside flange support 174 of the forward transverse end frame member 156. The function of the removable retainer lug 180 will be hereinafter described. As seen in FIG. 17, the longitudinal rail frame members 154 are notched out as at 186 in order to expose and provide access for the lower frame structure of the modular container hereinafter described. The previously described rearward transverse end frame member 158 is welded at its terminal ends to the longitudinal side members 154 and provides a pivot 59 on its rearmost edge as viewed in FIG. 17 which carries a hinge closure plate 58 and retainer lugs 60 welded thereto, along with hinged locking plates 62 positioned on the terminal ends of the pivotal plate 58. This apparatus is similar to the previously described apparatus as viewed in FIG. 5.

Continuing with reference to FIGS. 17 through 22 a modular container generally referred to by the reference numeral 200, comprises lower longitudinal rail frame members 202 and lower transverse end frame members 204 of L-shaped configuration adapted to be joined at their ends to appropriate corner castings 206 of rigid construction. The longitudinal frame members 202, transverse frame members 204 and corner castings 206 constitute a base frame, generally designated by the reference numeral 205, of suitable dimensions to be received in sliding engagement with the chassis frame 150 and secured thereto in nested relationship. Vertical upright corner supports 208 are securely fixed to the corner castings 206 and extend upwardly to support an upper frame structure comprising corner castings 210, upper longitudinal side rails 212 and transverse end rails 214. The lower frame structure with the vertical corner support and upper frame structure form a box-like frame and has for its closure means, side panels 216, floor and roof panels 218, end closure panel 220 and removable or hinged panels at its opposite end, which which provides access to the container for the storage of transportable materials. The lower frame 205 of the unit has elongated openings 222 provided in the longitudinal rail frame members 202 and the transverse end frame members 204, the function of which will be hereinafter described. The lower frame corner casting members 206 are apertured on their underside at 224 (FIG. 22) and the upper frame corner castings 210 have conical dowels 226 on their upper faces. The aperatured lower corner castings 206 and the upper doweled corner castings 210 provide a means for positioning and stacking the units 200 in superimposed relationship as seen in FIG. 22.

From the foregoing, it will be understood that the previously described chassis 150 is adapted to receive a modular container unit 200 in nested and secured relationship. The removable unit 200 provides a storage and shipping container, which may be lifted onto the chassis by means of a fork lift truck, the prongs of which enter the openings 222 provided in the lower longitudinal or transverse frame members 202 or 204 and position the unit into position from either side or the rear of the chassis whose retainer lugs 60 and 180 have been moved to an out-of-the-way position. Once the container is in place and nested within the framework of the chassis, the prongs of the fork lift truck are withdrawn and the previously mentioned retainer lugs 60 are rotated into engagement with the transverse end frame members 204 through the apertures 222 as more clearly seen in FIGS. 17 and 20, thereby fixedly securing the container against any movement and for all intents and purposes making the unit 200 and the chassis 150 an integral component. The removal of the container 200 is achieved by reversing the procedure, that is, by rotating the retainer lugs 60 to an out-of-the-way position and once again bringing a fork lift vehicle into operation, inserting the prongs of the fork lift into the apertures 222 of the container frame and removing it to its desired location.

Referring now more particularly to FIGS. 23 and 24, a conventional tractor type truck, generally indicated by the reference numeral 250 having a fifth wheel assembly and in cooperation with a conventional flat bed trailer generally indicated by the reference numeral 252 is shown as a means for transporting a plurality of the previously described container units 200 in stacked relationship as shown or the previously described modular van type of unit 12 previously described. It will be readily understood that available trucking facilities offer a satisfactory method for shipping and transporting the containers or van type modular units to varying destinations which upon arrival need only be unloaded by means of a fork lift truck shown in FIG. 24, which then can be unloaded at a terminal or individually delivered directly to the consumer by means of employing a previously described chassis unit. The containers, therefore, offer an economical and practical method of transporting goods or merchandise from manufacturer to consumer, or a means for an owner to fill and secure a container with his household goods and depositing the container at a terminal point where conventional and knowledgeable existing trucking facilities may deliver the container to a remote destination at a very low cost, while the owner of the stored materials is assured of the safe and protected conveyance of his articles at an economical rate having eliminated a great deal of handling.

I claim:

1. A multiple functional land trailer comprising:
    A. a main trailer chassis frame;
    B. a rigid, self-supporting trailer body supporting frame removably mounted on said main chassis frame;
    C. said main trailer chassis frame including:
        i. upstanding front and side walls defining an upwardly open trailer body supporting frame receiving bed;
    D. said trailer body supporting frame and said receiving bed of said main trailer chassis frame respectively having shapes and dimensions to interengage in mating nested relationship and with said receiving bed engaging and supporting said trailer body supporting frame in co-extensive intimate frame-to-frame supporting engagement therewith; and
    E. engaging and centering means on said chassis frame and said trailer body supporting frame for interengaging and securing said trailer body supporting frame to said receiving bed in an integrated and interlocked relationship as a substantially unitized composite structure of combined structural support and rigidity.

2. The invention defined in claim 1 including a telescopic boom carried by the main frame and adapted to extend rearwardly of the rear end of said trailer, winch means secured to the forward end of said trailer and flexible draft means cooperating with the removable container and said boom for urging the container from the trailer chassis.

3. The invention defined in claim 2 including a pulley mounted at the rearward end of said boom.

4. The invention defined in claim 1 including container removal facilitating means operatively carried by the main frame and selectively attachable to the removable container, said means being operable for urging the container from the trailer chassis.

5. A multiple functional land trailer as claimed in claim 1, including support legs pivotally connected to each trailer body frame, said support legs being retractable and extensible, said support legs being retractable and securable within the confines of said trailer body frame in a manner to prevent interference between the respective frames.

6. A multiple functional land trailer comprising:
    A. a wheeled chassis;
    B. a trailer body;
    C. said chassis including a generally quadrangular main frame and upstanding front and side walls defining a trailer body receiving bed to receive a rigid removable trailer body;
    D. said trailer body having a frame of size and shape corresponding to said trailer body receiving bed and removably nested and mating therein;
    E. said trailer body frame having apertures in at least one end wall thereof;

F. engaging and centering cam members secured to an end wall of said trailer body receiving bed and engageable in said apertures, said cam members and said apertures coacting for securing said trailer body in said trailer body receiving bed and interengaging and securing said frames in an integrated and interlocked relationship as a substantially unitized composite structure of combined structural support and rigidity.

7. A multiple functional land trailer as claimed in claim 6, wherein the securing means include at least one trailer body engaging and centering cam member secured to said front wall and projecting generally rearwardly, a rearwardly foldable upstanding rear wall on said chassis, at least one cam member carried by said rear wall, said trailer body having a mating rear opening in the frame thereof, said latter cam member being engageable in said latter opening when said rear wall is in an upstanding position.

8. The trailer defined in claim 7 wherein said rear wall is hinged to the main frame along its lateral rear edge and lock means securing said rear wall to each of said upstanding side walls.

9. The invention defined in claim 8 wherein said lock means includes a pair of arm members hinge-connected to the lateral edges of said rear wall and adapted to lie in parallel abutting engagement with the side walls when the rear wall is in the upstanding latched position.

10. The invention defined in claim 7 wherein the front wall and the rear wall each include a pair of said container-centering cam members.

11. The invention defined in claim 7 including forklift receiving openings in at least one of said upstanding side walls.

* * * * *